United States Patent [19]

Huang

[11] Patent Number: 5,776,223
[45] Date of Patent: Jul. 7, 1998

[54] METHOD OF MAKING SHAPED FIBERS

[75] Inventor: Jianzhong Huang, Westerville, Ohio

[73] Assignee: Owens Corning Fiberglas Technology, Inc., Summit, Ill.

[21] Appl. No.: 608,883

[22] Filed: Feb. 29, 1996

[51] Int. Cl.[6] .................. C03B 37/022; C03B 37/075; C03B 37/027; B29C 47/00

[52] U.S. Cl. .................. 65/437; 65/393; 65/402; 65/438; 65/439; 264/173; 264/177.1; 264/177.13; 264/177.14; 264/177.17

[58] Field of Search .................. 264/173, 174, 264/177.1, 177.13, 177.14, 177.17; 65/393, 402, 437, 438, 439, 442

[56] References Cited

U.S. PATENT DOCUMENTS

| | | | |
|---|---|---|---|
| 1,014,778 | 12/1912 | Scragg et al. | 264/177.17 |
| 3,197,812 | 8/1965 | Dietzsch et al. | 65/439 |
| 3,282,667 | 11/1966 | Stalego et al. | |
| 3,600,491 | 8/1971 | Shimoda et al. | |
| 3,607,185 | 9/1971 | Andrysiak et al. | |
| 3,930,106 | 12/1975 | Mihara et al. | |
| 4,135,903 | 1/1979 | Ohsato et al. | 65/466 |
| 4,144,044 | 3/1979 | Russell. | |
| 4,145,199 | 3/1979 | Russell | 65/438 |
| 4,291,096 | 9/1981 | Taylor. | |
| 4,316,924 | 2/1982 | Minemura et al. | |
| 4,437,869 | 3/1984 | Lecron et al. | |
| 4,526,597 | 7/1985 | Olinger et al. | |
| 4,622,054 | 11/1986 | Huey et al. | |
| 4,636,234 | 1/1987 | Huey et al. | |
| 4,666,485 | 5/1987 | Huey et al. | |
| 4,846,864 | 7/1989 | Huey. | |
| 4,941,904 | 7/1990 | Barch et al. | |
| 5,181,947 | 1/1993 | Mizuno et al. | 65/437 |

*Primary Examiner*—Donald E. Czaja
*Assistant Examiner*—Jacqueline A. Ruller
*Attorney, Agent, or Firm*—C. Michael Gegenheimer; Inger H. Eckert

[57] ABSTRACT

In a method of making a shaped fiber, a stream of fiberizable material is provided with an original shape and a void fraction from 20% to 80%. The void fraction can be provided by forming a hollow stream, a porous stream or a significantly shaped stream. The stream of fiberizable material has a soft portion at which the shape of the stream can be changed. Preferably the stream is provided by discharging molten fiberizable material through a first tube located in an orifice in a wall of a container, and introducing gas through a second tube into the interior of the molten material. The fiber stream is contacted to change the shape of the stream at the soft portion, preferably by applying torsion downstream from the soft portion. Torsion can be applied by contacting the fiber stream with a first surface moving in a direction generally transverse to the longitudinal axis of the stream. Preferably the fiber stream is also contacted with a second surface disposed on the opposite side of the stream from the first surface. The stream is cooled to make a fiber having a final shape different from the original shape, and preferably to make a fiber having a screw-type surface structure.

13 Claims, 4 Drawing Sheets

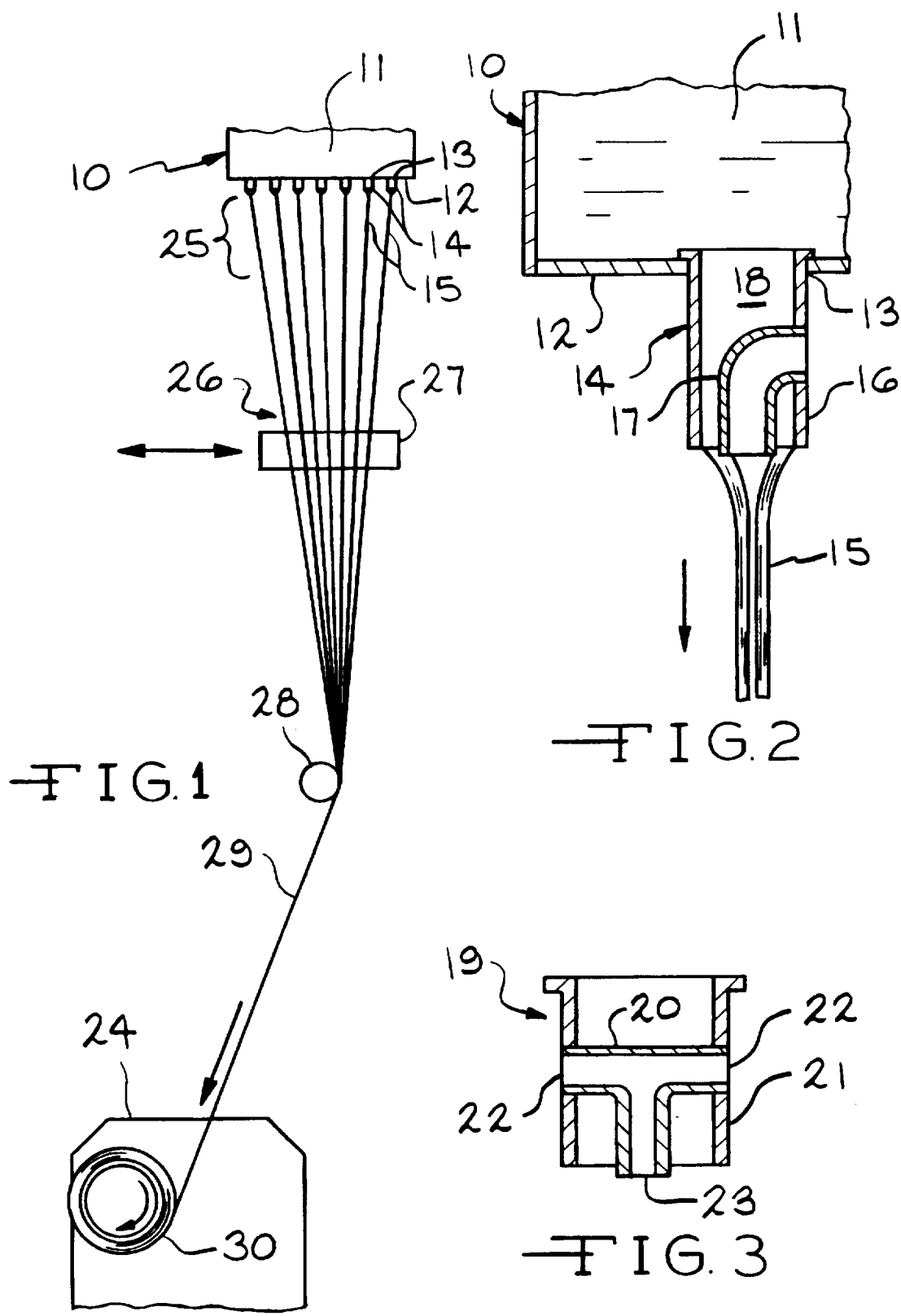

METHOD OF MAKING SHAPED FIBERS

TECHNICAL FIELD

This invention relates in general to the manufacture of fibers. More specifically, this invention relates to a method for making shaped fibers of a fiberizable material. The term "fiberizable material" includes mineral materials such as glass, organic materials such as polymers or asphalt, and other materials suitable for being formed into fibers.

BACKGROUND ART

The production of continuous glass fibers by mechanically drawing molten streams of glass from orifices in the bottom wall of a feeder or bushing is well known. It is also known to make hollow glass fibers using this process. For example, U.S. Pat. No. 4,846,864 to Huey discloses a tip assembly for use in a bushing for the production of hollow glass fibers by a continuous process. The hollow glass fibers have more surface area for the same amount of glass, and as a result they can be more effective in thermal and acoustical insulation products.

Glass fibers are also used as reinforcements in composite materials. When a fiber reinforced composite material is subjected to stress, some of the stress is transferred from the matrix of the composite material to the stronger fibers. As a result, the composite material has greater strength than an unreinforced matrix. To effectively transfer the stress, there must be a strong bond between the fibers and the matrix. Fibers which are perfectly shaped and have a smooth surface depend on the interaction between the surface and the matrix for this bonding. Such fibers when untreated usually lack a sufficient surface interaction to form a strong bond with a matrix. Consequently, the surface of the fibers is coated with a size composition containing a coupling agent to produce a better bond between the fibers and matrix. This sizing treatment increases the cost and complexity of the manufacturing process. Also, it is difficult to coat the fibers uniformly with the size composition. When the coating is not uniform, the bond between the fibers and the matrix is weaker. Therefore, it would be desirable to provide a method for making fibers which does not depend on the coupling agent of a sizing treatment to provide a strong bond with the matrix of a composite material. The method must be practical so that the fibers can be manufactured on a commercially acceptable basis.

DISCLOSURE OF THE INVENTION

This invention relates to a method of making a shaped fiber. In the method, a stream of fiberizable material is provided with an original shape and a void fraction from about 20% to about 80%. The void fraction can be provided by forming a hollow stream, a porous stream or a significantly shaped stream. The stream of fiberizable material has a soft portion at which the shape of the stream can be changed. Preferably the stream is provided by discharging molten fiberizable material through a first tube located in an orifice in a wall of a container, and introducing gas through a second tube into the interior of the molten material. The fiber stream is contacted to change the shape of the stream at the soft portion, preferably by applying torsion downstream from the soft portion. Torsion can be applied by contacting the fiber stream with a first surface moving in a direction generally transverse to the longitudinal axis of the stream. Preferably the fiber stream is also contacted with a second surface disposed on the opposite side of the stream from the first surface. The stream is cooled to make a fiber having a final shape different from the original shape, and preferably to make a fiber having a screw-type surface structure. The shaped fibers of the invention form a strong bond with the matrix of a composite material without requiring a sizing treatment. They are particularly effective in improving the longitudinal tensile strength of the composite material. The weight of the fibers is reduced compared to solid fibers having the same length and diameter, so they are very useful in making lightweight composite materials.

Various objects and advantages of this invention will become apparent to those skilled in the art from the following detailed description of the preferred embodiment, when read in light of the accompanying drawings.

BRIEF DESCRIPTION OF DRAWINGS

FIG. 1 is a schematic front elevational view of an apparatus for forming shaped hollow fibers in accordance with this invention, including a reciprocating roller which applies torsion to the fibers.

FIG. 2 is an enlarged cross-sectional view of a portion of the apparatus of FIG. 1, including a tip assembly located in an orifice of a bushing.

FIG. 3 is an alternate embodiment of a tip assembly for forming hollow fibers.

BEST MODE FOR CARRYING OUT THE INVENTION

Figures 4, 5:
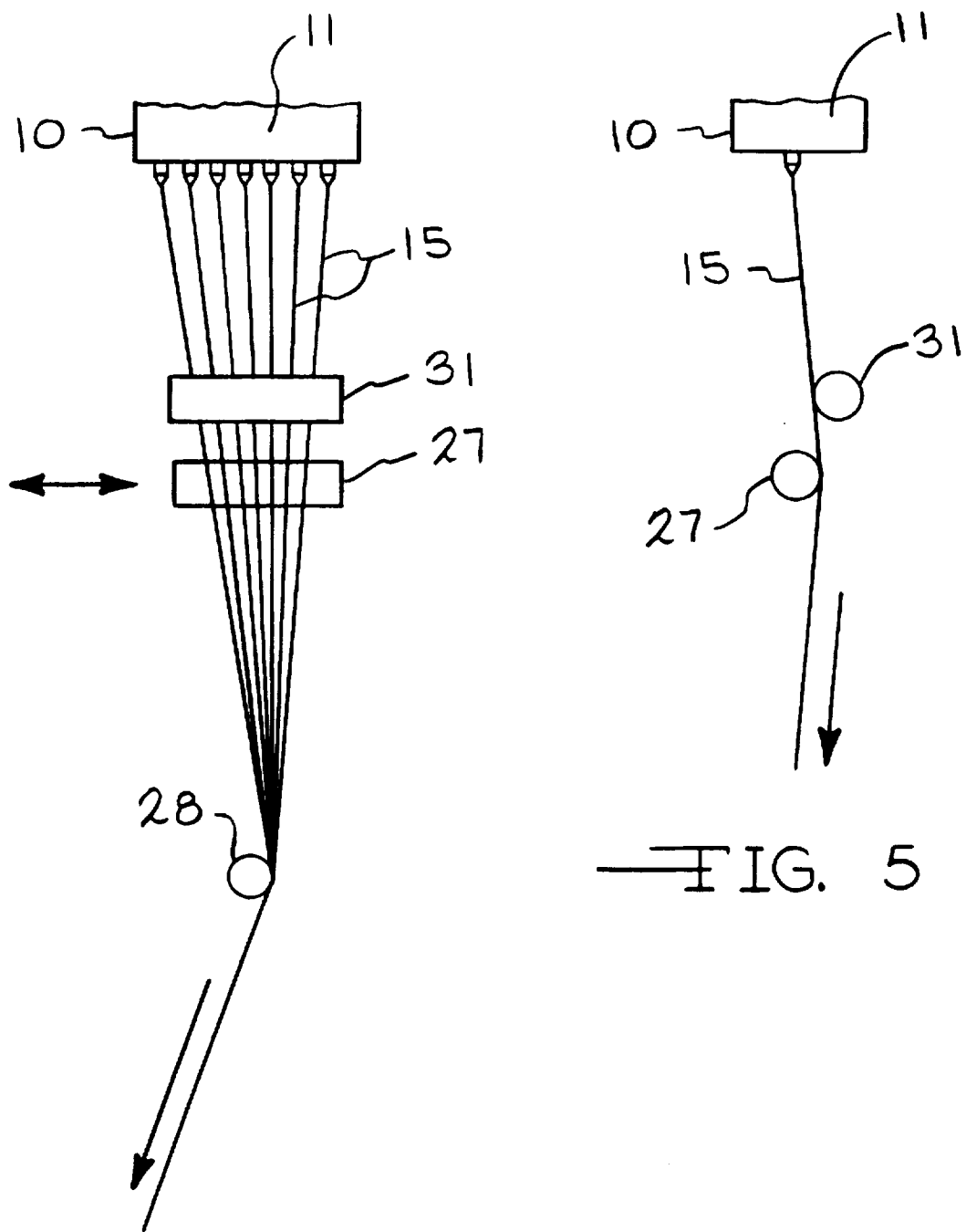
FIG. 4 is a schematic front elevational view of an alternate embodiment of an apparatus for forming shaped hollow fibers, including a pair of rollers which apply torsion to the fibers.
FIG. 5 is a schematic side elevational view of a portion of the apparatus of FIG. 4.

In the method of this invention, a stream of fiberizable material is provided which has an original shape and a void fraction from about 20% to about 80%. The stream of fiberizable material can be provided by using a rotary process, using double crucibles with the inner crucible empty, extruding fiberizable material around a mandrel, or other methods known to persons skilled in the art. As shown in FIGS. 1 through 3, preferably the stream of fiberizable material is provided by a continuous process. A bushing 10 receives a flow of molten fiberizable material 11 from any source, such as a furnace and forehearth for glass or an extruder for polymers. A heat source (not shown) can be included to maintain the fiberizable material in a molten condition. The bushing includes a discharge wall 12 having a plurality of orifices 13 formed therein. A tip assembly 14 is located in each of the orifices. The bushing discharges a plurality of streams 15 of molten fiberizable material through the tip assemblies. It is to be understood that the bushing can include multiple rows of tip assemblies instead of the single row illustrated in the drawings.

The tip assemblies are adapted to move or draw the gas or ambient air immediately surrounding the tip assemblies into the interior of the molten streams to produce continuous voids therein and form hollow streams. Referring to FIG. 2, one embodiment of a tip assembly 14 is comprised of first tube 16 and second tube 17, which is located within passageway 18 of the first tube. One end of the second tube is open to ambient air pressure immediately surrounding the tip assembly, and the other end of the second tube is located close to the exit of the first tube. As the molten fiberizable material flows through the annulus formed between the first and second tubes, air is aspirated through the second tube into the interior of the material to form a hollow stream 15. The shape of the stream is elongated and generally cylindrical, with a generally annular cross section.

In another embodiment of the invention, gas is introduced into the molten stream of thermoplastic material to make a porous stream. A method of forming a porous glass stream to make porous fibers is disclosed in U.S. Pat. No. 4,526,597 to Olinger et al., issued Jul. 2, 1985, incorporated by reference herein. Electrolysis is another method to introduce gas into molten thermoplastic material. Another method is by use of an oxidizing agent which decomposes to form gas in the molten thermoplastic material.

Another embodiment of a tip assembly is illustrated in FIG. 3. The tip assembly 19 incorporates a generally "T" shaped second tube 20 disposed within a first tube 21. The gas immediately surrounding the first tube is drawn into inlets 22 of the second tube and exhausted at outlet 23 thereof. Other suitable configurations of tip assemblies are disclosed in U.S. Pat. No. 4,846,864 to Huey, issued Jul. 11, 1989, incorporated by reference herein. The Huey patent also discloses "tipless" designs which are an alternate embodiment for forming the hollow fibers. The structure of the tip assembly can be modified for different types of fiberizable material.

The hollow streams of molten fiberizable material are drawn from the bushing by any suitable means, such as by the mechanical action of winder 24. The molten streams are very soft as they are discharged from the bushing, and they become harder as they are drawn away from the bushing and cooled. The streams have a "soft portion" 25 in the area near the bushing. The term "soft portion" means an area of a stream having physical properties within the range of parameters required for deforming the shape of the stream. For glass, the soft portion should have a viscosity of less than about 107.6 poise as measured according to ASTM C965-81. (A related method for measuring the softening point of glass is ASTM C338-93.) The soft portion can be provided by forming a molten stream of fiberizable material, by heat treating a previously formed fiber, or by any other method which provides the suitable properties.

The streams cool further and harden to form solid hollow fibers 26 downstream from the soft portion. If desired, the streams can be cooled rapidly (not shown) by quenching with air, carbon dioxide, nitrogen, water, or other cooling gases or fluids.

According to the present method, the stream of fiberizable material is contacted to change the shape of the stream at the soft portion. Preferably the stream is contacted at a location downstream from the soft portion. The stream can be contacted by any means suitable for changing the shape from its original shape to a desired final shape. In the illustrated method, the fibers 26 are drawn past a roller 27, which contacts the fibers by applying torsion downstream from their soft portion 25. This contact changes the shape of the streams at their soft portion, as will be described below. The roller applies torsion by moving in a direction generally transverse to the longitudinal axis of the stream. Usually the transverse direction is the horizontal direction, because the streams are drawn from the bushing in a generally vertical direction. Preferably torsion is applied to the stream by reciprocating movement of the roller, i.e., the roller is moved back and forth horizontally in contact with the stream. The roller can be adapted for such movement by any suitable means. If the fiber forming apparatus includes a size applicator, the applicator roll can be modified for horizontal movement in contact with the streams.

After being drawn past the roller, the resulting shaped hollow fibers are then drawn through gathering shoe 28 as an advancing strand 29, which is collected as package 30 on the winder. The shape of the fibers and their void fraction will be discussed below.

When torsion is applied to the stream by contacting it with a first surface such as a roller, preferably the stream is also contacted with a second surface such as a second roller. FIGS. 4 and 5 illustrate a preferred embodiment in which the streams of fiberizable material are contacted with two rollers. The first roller 27 applies torsion to the streams by moving back and forth in the horizontal direction. The second roller 31 contacts the streams on the side opposite the first roller. It has been found easier to apply torsional force to the streams when they are contacted with two rollers on opposed sides, rather than with a single roller. The second roller can be stationary as illustrated, or it can move back and forth horizontally in a manner reverse to the movement of the first roller. The first roller can also be stationary while the second roller is moving, or both rollers can be moving. In the illustrated embodiment, the first and second rollers are separated vertically from one another by a short distance. However, the rollers can also be positioned adjacent to one another with the streams being drawn between the rollers. If the bushing includes multiple rows of tip assemblies, additional rollers can be employed to apply torsion to the streams from each of the rows.

Figure 6:
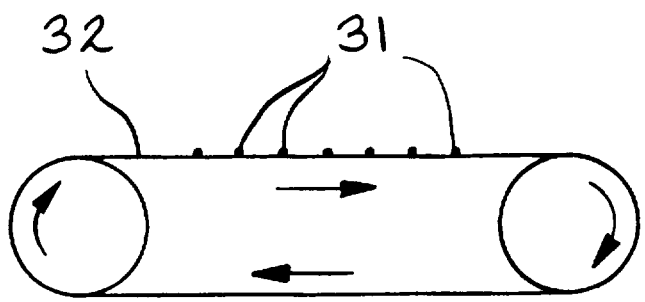
FIG. 6 is a schematic plan view of a portion of an alternate apparatus for forming shaped hollow fibers, including a rotating belt which applies torsion to the fibers.
Figure 7:
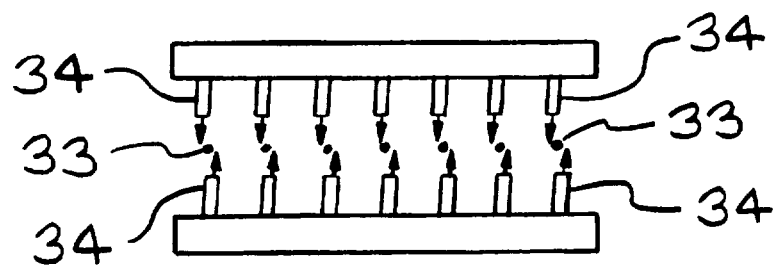
FIG. 7 is a schematic plan view of a portion of another alternate apparatus for forming shaped hollow fibers, including directed streams of gas which apply torsion to the fibers.

Other methods besides rollers can also be used to contact the stream of fiberizable material, to change the shape from its original shape to a desired final shape. FIG. 6 illustrates a method in which the streams 31 are contacted with a rotating belt 32 to apply torsion to the streams. FIG. 7 illustrates a method in which the streams 33 are contacted with directed streams of gas 34 to apply torsion to the streams. In these methods, preferably the streams are contacted downstream from their soft portion.

Figure 8:
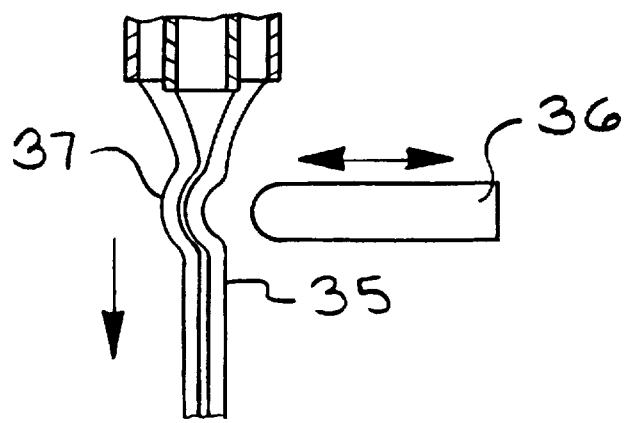
FIG. 8 is a schematic side elevational view of a portion of another alternate apparatus for forming shaped hollow fibers, including a reciprocating ram which contacts the soft portion of the stream.

Another method for contacting the stream of fiberizable material to change its shape is shown in FIG. 8. In this method, the soft portion of the stream 35 is contacted with a reciprocating ram 36 such as a piece of metal having a rounded end. Contact of the stream with the ram produces an undulating portion 37 in the stream. In this method, preferably the stream is rapidly cooled after contact with the ram to ensure that it retains the modified shape. Still other methods for changing the shape of the stream can include other types of mechanical impingement by a variety of devices, differential heating and attenuation of the stream, vibration of the stream, and rotation of the distal end of the stream. The cross section, the overall shape, or both can be changed. Changing the shape of the stream other than by applying torsion creates novel fibers having improved properties in composite materials and other applications.

Figure 9:
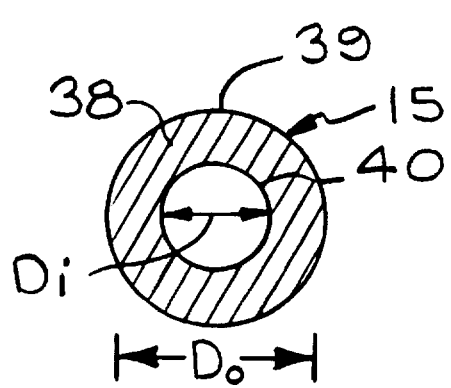
FIG. 9 is an enlarged cross-sectional view of a cylindrical, hollow glass fiber prior to applying torsion to the fiber.

The resulting fiber of this invention has a final shape which is different from the original formed shape. In the preferred method illustrated in FIGS. 1 and 4, the original shape of the stream 15 discharged from the bushing 10 is elongated and generally cylindrical, with a generally annular cross section. FIG. 9 shows the generally annular cross section of the stream 15. The stream includes an annular portion 38 formed of molten glass and having an outer surface 39 which defines an outside diameter $D_o$. The stream further includes a hollow core 40 which has a generally circular cross section and defines an inside diameter $D_i$. In the preferred embodiment, the hollow core is generally concentric with the outer surface, but it can also be non-concentric.

Figure 10:
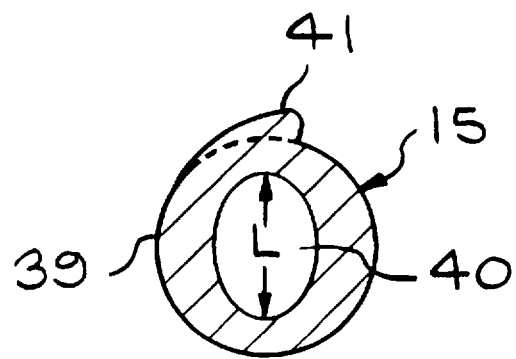
FIG. 10 is a view of the fiber of FIG. 9 after torsion has been applied to the fiber in accordance with this invention.
Figure 11:
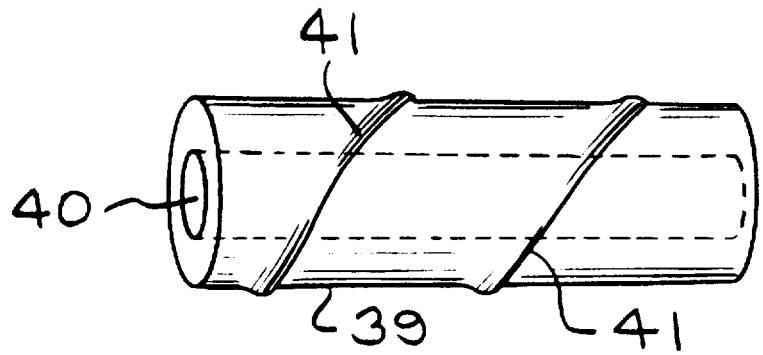
FIG. 11 is a schematic perspective view of the fiber of FIG. 10 showing the screw-type surface structure of the fiber.

FIGS. 10 and 11 illustrate the final shape of the stream 15 after torsion is applied to the stream by contact with the roller. It can be seen that the stream retains the generally annular cross section. However, the outer surface 39 of the stream has been deformed. The surface structure of the stream has a protruding, screw-type of pattern 41 resembling a screw nail. Also, the core 40 of the stream has been deformed to an elliptical cross section instead of a circular cross section. The length L of the elliptical core extends in the direction of the protruding screw-type pattern.

The fibers having a screw-type surface structure form a strong bond with the matrix of a composite material without requiring a sizing treatment. As a result, there is a better load transfer between the matrix and the fibers when the composite material is subjected to stress. Because of the screw-type surface structure, the fibers are particularly effective in improving the load transfer in the longitudinal direction (i.e., the fiber direction). Significantly more energy is required to pull the fibers out of the matrix in the longitudinal direction. The fibers improve the longitudinal tensile strength of the composite material by an amount within the range from about 10% to about 80%, and preferably from about 30% to about 80%, compared to an unreinforced composite material. The fibers also improve the transverse tensile strength of the composite material by an amount within the range from about 10% to about 50%. The longitudinal tensile strength and transverse tensile strength are both measured according to ASTM D3039\D3039M-95.

The fibers are also structurally strong so that they do not easily break and lose their reinforcing properties in a composite material. As can be seen in FIGS. 10 and 11, the fiber retains a generally annular cross section. The entire fiber is not deformed, but rather the surface structure of the fiber is deformed. If the entire fiber was deformed, the resulting structure would be significantly weaker. For example, if the fiber was deformed into a twisted ribbon, it would be too easy to break and not as useful as a reinforcement in a composite material.

As noted above, the core 40 of the stream has been deformed to an elliptical cross section instead of a circular cross section. Prior to practicing this invention, it was expected that the core would retain a circular cross section if torsion was applied to the stream. It was unexpected for the core to change to an elliptical cross section. This change in the shape of the core allows the screw-type structure to be formed on the surface while retaining the generally annular cross section of the stream. If the core was circular in cross section, the resulting fiber would be shaped differently and would not provide the benefits of the fiber of this invention.

The number of turns (i.e., complete revolutions) of the screw-type surface structure per length of fiber can be varied by modifying the process conditions. The number of turns is increased by increasing the speed of the roller, and reduced by increasing the diameter of the stream or by increasing the speed of the stream from the bushing. The optimum number of turns per length of fiber depends on the application. When the fiber is a continuous fiber used as a reinforcement in a composite material, preferably it has at least about one turn per 2.5 centimeters of fiber. When the fiber is chopped into pieces before use, for example pieces of about 0.5 centimeter length, preferably each piece of fiber has at least about one turn. Too many turns can make it difficult to economically manufacture the fibers. Preferably, the number of turns per unit length is limited so that the length of each turn is greater than the diameter of the fiber.

It has been found that a key to forming fibers having a screw-type surface structure is to start with a stream of fiberizable material having a void fraction within a particular range. Specifically, the stream of fiberizable material should have a void fraction from about 20% to about 80%, and preferably from about 30% to about 60%. When the stream has a void fraction within this range, applying torsion to the stream is sufficient to change the surface structure of the stream to the desired screw-type pattern. If the void fraction of the stream is too low, it is too difficult to deform the stream to form this structure. If the void fraction of the stream is too high, the stream can be deformed too easily. As a result, the stream may break from contact, or the final shape may be too deformed to be useful as a reinforcement, for example an excessively twisted shape.

The void fraction of a hollow stream of fiberizable material such as described above is defined as $(D_i/D_o)^2$, where $D_i$ is the inside diameter and $D_o$ is the outside diameter of the stream. The void fraction of the hollow stream is dependent on factors such as the tip assembly design, e.g., the inside diameter of the second tube, the speed at which the streams are drawn from the bushing, the pressure of the gas, and the temperature and pressure of the fiberizable material.

As described above, the required void fraction can also be provided by forming a porous stream of fiberizable material which includes pockets of gas formed therein. For porous fibers, the void fraction is defined as the cross-sectional area of the pores divided by the overall cross-sectional area of the stream.

Figures 12, 13:
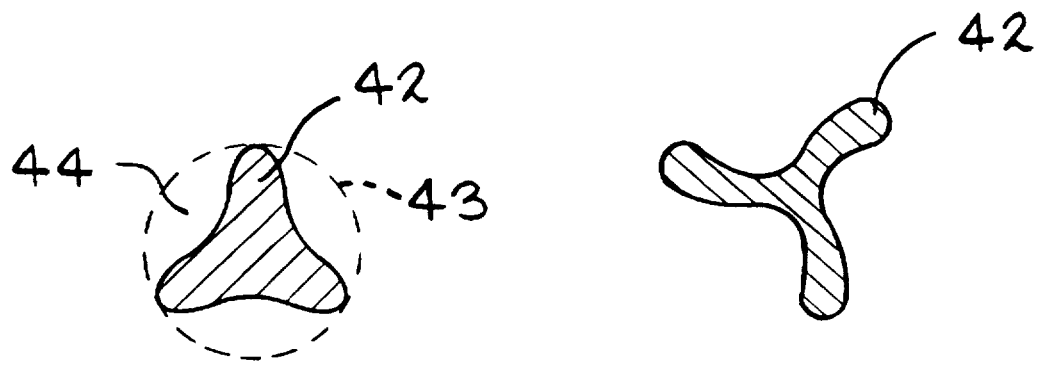
FIG. 12 is an enlarged cross-sectional view of a trilobal glass fiber prior to applying torsion to the fiber.
FIG. 13 is a view of the fiber of FIG. 12 after torsion has been applied to the fiber.

In another embodiment of the invention, the required void fraction is provided by forming a significantly shaped solid stream of fiberizable material. The stream can include, for example, trilobal fibers such as disclosed in U.S. Pat. No. 4,636,234 to Huey et al, issued Jan. 13, 1987, incorporated by reference herein. Other significantly shaped streams formed in non-circular orifices can also be used, for example, H-shaped or I-shaped streams. FIG. 12 illustrates a stream 42 of glass having a trilobal cross section. For significantly shaped fibers, the void fraction is determined by drawing a circle around the perimeter of the fibers, such as circle 43 shown in FIG. 12. The void fraction is then defined as the cross-sectional area of the space 44 in the circle outside the stream, divided by the overall cross-sectional area of the circle.

FIG. 13 illustrates the final shape of the trilobal stream 42 after torsion is applied to the stream by contact with a roller such as described above. It can be seen that the lobes of the stream are elongated and their ends are curved in the direction of torsion. The center portion of the stream is smaller. Applying torsion to a significantly shaped stream such as a trilobal stream creates fibers useful as reinforcements to improve the longitudinal tensile strength of a composite material.

The average diameter of the shaped fibers is preferably within the range used for reinforcement applications. Fibers having a generally annular cross section preferably have an average outside diameter from about 5 microns to about 130 microns, and more preferably from about 5 microns to about 30 microns. Fibers having a diameter within the 5–30 micron range are useful for reinforcing most composites including resins and other polymers, ceramics, and some metals. Fibers having a diameter up to 120–130 microns are useful for reinforcing some metal composites. The diameter of the shaped fibers can be modified by changing the size of the tip assemblies, further attenuating the molten streams, and other methods known in the art.

The fiberizable material can be selected from mineral materials, organic materials such as polymers or asphalt, some metallic materials, and any other heat softenable materials suitable for making fibers. A preferred mineral material is glass, but other mineral materials can also be used such as rock, slag or basalt. While temperature conditions vary, generally the temperature of the molten glass within the bushing is from about 800° C. to about 1325° C., and typically is about 1040° C.

A suitable polymer can be any heat softenable polymer. Examples include, but are not limited to, polypropylene, polyethylene, poly(ethylene terephthalate) ("PET"), poly (butylene terephthalate) ("PBT"), poly(phenylene sulfide) ("PPS"), polycarbonate, polystyrene, and polyamide. Generally the temperature of molten polypropylene within the bushing is from about 150° C. to about 260° C., and the temperature can vary for other polymers.

INDUSTRIAL APPLICABILITY

The shaped fibers of the invention provide excellent performance in a wide variety of applications. Preferably the fibers are used as reinforcements in composite materials. The fibers can be used to reinforce any organic or inorganic matrix suitable for use with other types of reinforcement. For example, thermoplastic or thermoset resins, such as polyesters or epoxies, could be used. Cements, low melting point metals, and silicate matrices could also be reinforced. The composite materials can be used to make parts for vehicles, to make electronic components, to make specialty products such as sporting goods or utility poles, or many other uses known in the art. The shaped fibers can also be used in other applications such as thermal and acoustical insulation products, absorbent products, and filtration products.

The principle and mode of operation of this invention have been explained and illustrated in its preferred embodiment. However, it must be understood that this invention may be practiced otherwise than as specifically explained and illustrated without departing from its spirit or scope.

I claim:

1. A method of making a shaped fiber for reinforcing a composite material, the method comprising:

providing a stream of fiberizable material having a cylindrical shape with a void fraction from about 20% to about 80%, and having a soft portion, applying torsion to the stream to change the stream at the soft portion, and cooling the stream to make a fiber having a substantially untwisted cylindrical shape with a helical protrusion on its surface.

2. The method of claim 1 in which the stream of fiberizable material has a void fraction from about 30% to about 60%.

3. The method of claim 1 in which the stream of fiberizable material is hollow.

4. The method of claim 1 in which torsion is applied by contacting the stream with a first surface moving in a direction generally transverse to the longitudinal axis of the stream.

5. The method of claim 4 in which the first surface reciprocates.

6. The method of claim 4 in which the stream is also contacted with a second surface disposed on the side of the stream opposite the first surface.

7. The method of claim 1 in which the helical protrusion has at least about 1 turn per 2.5 centimeters of fiber.

8. The method of claim 1 in which a hollow stream of fiberizable material is provided by discharging molten fiberizable material through an orifice in a wall of a container, and introducing gas into the interior of the molten fiberizable material.

9. The method of claim 1 in which the stream is contacted downstream from the soft portion to change the stream at the soft portion.

10. The method of claim 1 in which the stream of fiberizable material is porous.

11. The method of claim 1 in which the fiberizable material is glass.

12. The method of claim 1 in which the stream of fiberizable material is a hollow stream of glass having a void fraction from about 30% to about 60%, and the fiber has a generally annular cross section and a generally elliptical core.

13. A method of making a shaped fiber for reinforcing a composite material, the method comprising:

providing a stream of fiberizable material having a cylindrical shape with a hollow core having a generally circular cross section, and having a soft portion, applying torsion to the stream to change the stream at the soft portion, and cooling the stream to make a fiber having a cylindrical shape with a hollow core having a generally elliptical cross section.

* * * * *